Figure 1:
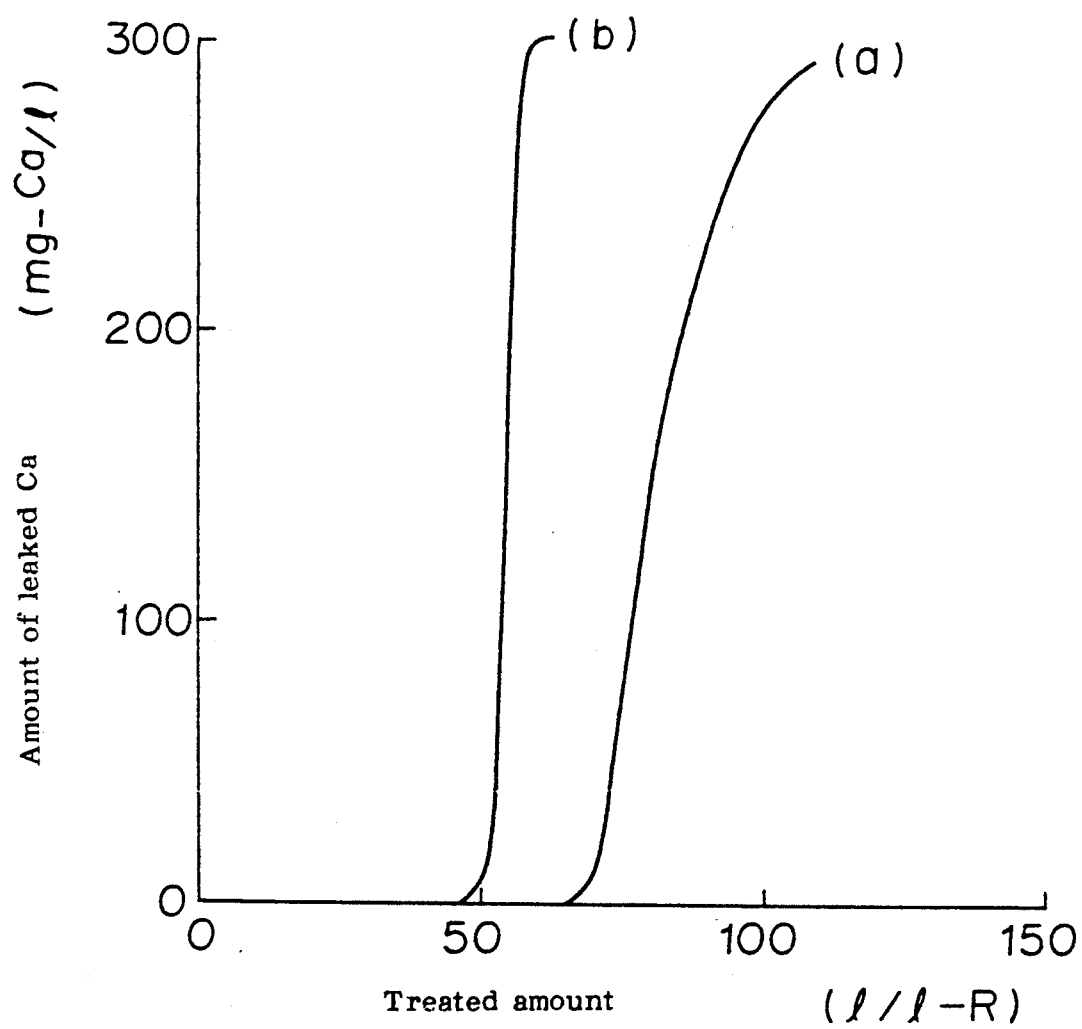

United States Patent [19]

Ito et al.

[11] Patent Number: 5,208,264
[45] Date of Patent: May 4, 1993

[54] PROCESS FOR PRODUCING AN AMINOPHOSPHORIC ACID-TYPE CHELATE RESIN

[75] Inventors: Tsuyoshi Ito; Takayuki Tashiro, both of Tokyo, Japan

[73] Assignee: Mitsubishi Kasei Corporation, Tokyo, Japan

[21] Appl. No.: 917,973

[22] Filed: Jul. 24, 1992

[30] Foreign Application Priority Data

Jul. 26, 1991 [JP] Japan .................... 3-209938

[51] Int. Cl.$^5$ .................... C08F 8/40; B01J 45/00
[52] U.S. Cl. .................... 521/32; 521/31; 521/146; 525/332.2; 525/379; 525/381
[58] Field of Search ............ 521/31, 32, 146; 525/332.2, 329, 381

[56] References Cited

U.S. PATENT DOCUMENTS

| | | | |
|---|---|---|---|
| 2,883,349 | 4/1959 | Tsunoda et al. | 260/2.1 |
| 4,002,564 | 1/1977 | Carbonel et al. | 521/30 |
| 4,277,566 | 7/1981 | Kataoka et al. | 521/32 |
| 4,442,231 | 4/1984 | Kataoka et al. | 521/32 |
| 5,109,074 | 4/1992 | Eiffler et al. | 521/32 |

FOREIGN PATENT DOCUMENTS

| | | |
|---|---|---|
| 0065120 | 11/1982 | European Pat. Off. . |
| 0355007 | 2/1990 | European Pat. Off. . |
| 2442859 | 6/1990 | France . |

Primary Examiner—Morton Foelak
Attorney, Agent, or Firm—Oblon, Spivak, McClelland, Maier & Neustadt

[57] ABSTRACT

A process for producing an aminophosphoric acid-type chelate resin, which comprises aminating halomethyl groups of a polymer having the halomethyl groups on aromatic nuclei, followed by phosphomethylation, wherein the amination reaction is conducted by means of an amine mixture comprising a monoamine and a polyamine, wherein the proportion of the monoamine to the total amount of both amines is from 20 to 70% by mole.

12 Claims, 1 Drawing Sheet

PROCESS FOR PRODUCING AN AMINOPHOSPHORIC ACID-TYPE CHELATE RESIN

The present invention relates to a process for producing an aminophosphoric acid-type chelate resin. More particularly, it relates to a process for producing an aminophosphoric acid-type chelate resin having a high adsorption capacity and excellent cycling strength.

An aminophosphoric acid-type chelate resin is used advantageously, for example, for the purification of brine to be used as a starting material for electrolytic caustic soda, and it is a chelate resin which is capable of efficiently removing impurities in the brine such as calcium and strontium.

Processes for producing aminophosphoric acid-type chelate resins have been proposed, for example, in Japanese Examined Patent Publication No. 25081/1983 and U.S. Pat. No. 4,002,564 (Japanese Examined Patent Publication No. 28536/1985). Each of these publications is directed to a process for producing an aminophosphoric acid-type chelate resin, which comprises aminating halomethyl groups of polymer particles having the halomethyl groups on aromatic nuclei, followed by phosphomethylation. A difference between the two publications is in the type of the amine to be used for the amination reaction, i.e. the former discloses aliphatic polyamines such as ethylenediamine and diethylenetriamine, and the latter discloses hexamethylenetetramine.

In the use of the above chelate resin, adsorbed metals are desorbed by treatment with an aqueous acid solution, and then the resin may be reused in the acid form as it is, but is preferably reused after being converted to an alkali salt-form by regeneration treatment with an aqueous alkaline solution.

The amino phosphoric acid-type chelate resins produced by the processes disclosed in the above publications have a problem that the adsorption capacity and the cycling strength vary depending upon the type of the amine used, and resins having a relatively high adsorption capacity tend to be poor in the cycling strength. Therefore, they have a drawback that the resins are likely to be damaged by the repeated acid-alkali loading of the above-mentioned regeneration step.

With the resin of the former publication, the drawback of being poor in the cycling strength is particularly remarkable. On the other hand, with the resin of the latter publication, a hydrolysis step is required prior to the phosphomethylation, since hexamethylenetetramine is used, and when used for the purification of brine, this resin has a drawback that it is inferior in the adsorptivity for strontium ions although it is excellent in the adsorptivity for calcium ions.

Further, Japanese Examined Patent Publication No. 55523/1987 discloses an aminophosphoric acid-type chelate resin similar to the one in the present application and also discloses a monoamine and a polyamine as an aminating agent, but it does not disclose a combined use of the monoamine and the polyamine.

The present invention has been made in view of the above described situation of conventional resins, and it is an object of the present invention to provide an aminophosphoric acid-type chelate resin having a high adsorption capacity and excellent cycling strength.

The present inventors have conducted various studies to accomplish the above object and as a result, have found it possible to readily accomplish the above object by conducting an amination reaction of halomethyl groups by means of a mixture of amines of certain specific types and proportions. The present invention has been accomplished on the basis of this discovery.

The present invention provides a process for producing an aminophosphoric acid-type chelate resin, which comprises aminating halomethyl groups of a polymer having the halomethyl groups on aromatic nuclei, followed by phosphomethylation, wherein the amination reaction is conducted by means of an amine mixture comprising a monoamine and a polyamine, wherein the proportion of the monoamine to the total amount of both amines is from 20 to 70% by mole.

In the accompanying drawings, FIG. 1 is a graph showing leak curves representing the results of continuous liquid column chromatographic tests with respect to the chelate resin produced by the process of the present invention in Example 3 and a conventional chelate resin having iminodiacetic acid groups as functional groups. In the Figure, (a) represents the results with the aminophosphoric acid-type chelate resin of the present invention, and (b) represents the results with the iminodiacetic acid-type conventional chelate resin.

Now, the present invention will be described in detail.

Polymer particles having halomethyl groups on aromatic nuclei are already known in the field of e.g. production of basic ion exchange resins and accordingly can be produced by a known method. For example, a method may be employed in which an aromatic monovinyl monomer is polymerized in the presence of a crosslinking monomer, or an aromatic monovinyl monomer, a copolymerizable other monovinyl monomer and a crosslinking monomer are polymerized, followed by halomethylation.

As the above-mentioned crosslinking monomer, a polyvinyl monomer such as divinylbenzene, divinyltoluene, ethylene glycol diacrylate or ethylene glycol dimethacrylate, may, for example, be mentioned. As the above aromatic monovinyl monomer, styrene, α-methylstyrene, ethylstyrene, a styrene derivative having a substituent such as o-chloro-, or o-methyl-styrene, may, for example, be mentioned. As other copolymerizable monovinyl monomers, various monovinyl monomers copolymerizable with an aromatic monovinyl monomer by a conventional method, such as methyl methacrylate, vinyl acetate and acrylonitrile, may, for example, be mentioned. Monomers of these groups may be used in combination as mixtures of two or more monomers of the respective groups.

The shape of the polymer may be granular or spherical. However, in order to impart excellent metal-adsorbing ability and high mechanical strength to the chelate resin, it is preferred to employ a crosslinked polymer of a spherical shape. In this case, the crosslinking monomer is preferably used in an amount of from 3 to 10 mol % to the total amount of monomers. The polymer may be of a gel-form, but is preferably a polymer having a porous structure.

A spherical polymer is produced usually by a suspension polymerization method. The suspension polymerization is conducted usually by adding necessary monomers, a radical polymerization catalyst, etc. to an aqueous medium containing a suspension stabilizer and polymerizing the monomers under stirring at a temperature of from 60° to 90° C. The catalyst may suitably be selected from those commonly used for the polymerization of vinyl compounds. For example, a radical polymerization catalyst such as benzoyl peroxide, azobisisobutyronitrile, lauroyl peroxide or tert-butyl peroxide, may be mentioned. If necessary, a suspension stabilizer such as polyvinyl alcohol, sodium polymethacrylate or sodium polyacrylate, may be used. The polymer obtained by such a reaction is thoroughly washed with hot water and then dried.

To impart a porous structure to the spherical polymer, a known method may be employed wherein a liquid which serves as a solvent to the monomers and as a phase-separating agent to the polymer, such as isooctane or a higher alcohol (such as octanol), is added to the polymerization system. Otherwise, it is possible to employ a method wherein a suitable linear polymer (such as polystyrene) is added to the polymerization system, and after completion of the polymerization reaction, the linear polymer is extracted and removed by a solvent from the formed copolymer, or a method wherein, instead of the linear polymer, a solution thereof (such as a toluene solution of polystyrene) is added.

The specific surface area of the above polymer is preferably from 5 to 50 m$^2$/g dry resin, and the porosity is preferably within a range of from 0.1 to 0.5 m$\lambda$/g-dry resin, and the particle size is preferably within a range of from 200 to 800 μm.

As a method for introducing halomethyl groups to the aromatic nuclei of the above polymer, the following method is usually employed.

Namely, a halomethylating agent and a Lewis acid-type catalyst are added to the polymer, and the reaction is conducted by cooling or heating, as the case requires. The reaction is usually preferably conducted under heating at a temperature of from 40° to 70° C., and the reaction time is preferably from 2 to 10 hours.

As the above halomethylating agent, chloromethyl methyl ether, chloromethyl ethyl ether, dichloromethyl ether or bromoethyl ethyl ether may, for example, be mentioned. As the catalyst, anhydrous zinc chloride, aluminum chloride or stannic chloride may, for example, be mentioned. As the solvent, a halogenated hydrocarbon such as dichloroethylene, trichloroethylene or 1,1,1-trichloroethane, is preferred.

Otherwise, the polymer having halomethyl groups on aromatic nuclei may be directly obtained in the same manner as the above method for the production of the polymer except that instead of the aromatic monovinyl monomer used in the above method, an aromatic monovinyl monomer having a halomethyl group at the p-position (such as p-vinylbenzyl chloride, or p-vinylbenzyl bromide) is employed.

The halomethylating agent may be used within a range of 1 to 4 mol per mol of the aromatic ring in the case of halomethylation. In the case of a preliminarily halogenated monomer, the halogen content in the polymer may be adjusted by controlling the amount of the monomer.

The present invention is characterized in that in the amination reaction of halomethyl groups of the above polymer, an amine mixture comprising a monoamine and a polyamine, wherein the proportion of the monoamine to the total amount of both amines is from 20 to 70% by mole, is used.

The monoamine and the polyamine are preferably aliphatic. The monoamine may, for example, be a monoalkanolamine having at most 5 carbon atoms, such as ethanolamine, propanolamine or butanolamine, or a monoalkylamine having at most 5 carbon atoms, such as ethylamine, propylamine or butylamine. In the present invention, it is particularly preferred to use an alkanolamine as the monoamine with a view to imparting a hydrophilic nature to the chelate resin.

The polyamine may, for example, be an alkylenediamine having from 2 to 8 carbon atoms such as ethylenediamine, trimethylenediamine, tetramethylenediamine or pentamethylenediamine, or an N-monoalkyl derivative thereof (such as an N-methyl derivative thereof), or a polyethylenepolyamine such as diethylenetriamine, triethylenetetramine or tetraethylenepentamine, or an N-monoalkyl derivative thereof (such as an N-methyl derivative thereof). Among them, an alkylenediamine such as ethylenediamine is particularly preferred as the polyamine.

The proportions of the monoamine and the polyamine are particularly important. In the present invention, it is necessary to use the amine mixture wherein the proportion of the monoamine to the total amount of both amines is from 20 to 70% by mole, preferably from 30 to 60% by mole. If the proportion of the monoamine is less than this range, it tends to be difficult to obtain a chelate resin having adequate cycling strength. On the other hand, if it exceeds the above range, it becomes difficult to obtain a chelate resin having an adequate adsorption capacity. In either case, the object of the present invention can not be attained.

The amination reaction may be conducted in the presence or absence of a solvent. It is preferred to conduct the amination reaction after the polymer is adequately swelled in the presence of a solvent inert to the monoamine and the polyamine used. As the solvent, toluene, benzene, nitrobenzene, monochlorobenzene or dioxane may, for example, be appropriately used. Further, it is preferred to raise the temperature, as the case requires, at the time of swelling the polymer or at the time of the amination reaction. The temperature may be raised within a range of from 40° to 100° C. The reaction time is preferably 2 to 10 hours.

With respect to the amount of the amine mixture to be used for amination, it is necessary to use it in an amount corresponding to the halogen atoms introduced. Usually, the amine mixture is used in an amount of from 10 to 30 mmol per gram of the polymer having halomethyl groups.

The phosphomethylation reaction can be conducted by either a Mannich type reaction using a halomethanephosphonic acid or a Mannich type reaction using formaldehyde and phosphorous acid, for example, in accordance with the method as disclosed in Japanese Examined Patent Publication No. 25081/1983, after thoroughly washing the polymer after the amination reaction, to remove unreacted monoamine and polyamine. From the industrial point of view, the latter reaction is advantageous.

A preferred mode of operation of the phosphomethylation reaction using formaldehyde and phosphorous acid is as follows.

Namely, the polymer after the amination reaction is suspended in water and permitted to swell, and then it is reacted with formaldehyde and phosphorous acid in the presence of a small amount of a mineral acid such as hydrochloric acid or sulfuric acid. The reaction is conducted under stirring, as the case requires, and the reaction temperature is preferably at least 70° C. The reaction time is preferably from 4 to 10 hours.

By the above reaction, amino groups are converted to phosphomethylamino groups. Usually, one molecule of an amino group is converted to one molecule of a phosphomethylamino group by one molecule of formaldehyde and one molecule of phosphorous acid. Therefore, the amounts of the reagents for the reaction may be selected so that a part or whole of the amino groups in the starting material polymer will be converted to phosphomethylamino groups.

The chelate resin obtained by the process of the present invention exhibits a large adsorption capacity to many metal ions. Furthermore, it exhibits particularly excellent selectivity for bivalent metal ions such as calcium, magnesium and strontium ions present as impurities in an aqueous sodium chloride solution having a high concentration. The most remarkable characteristic is that it is excellent in the cycling strength as compared with conventional aminophosphoric acid-type chelate resins. Accordingly, with the chelate resin of the present invention, the damage of the resin by repeated acid-alkali loading of the regeneration step can be reduced.

Now, the present invention will be described in further detail with reference to Examples. However, it should be understood that the present invention is by no means restricted by such specific Examples.

In the following Examples, chloromethylated polymers (A) and (B) prepared by conducting polymerization and chloromethylation in the following manner, were used, and evaluation of the physical properties of the chelate resins was conducted by the following method.

1. Preparation of polymers

Polymer (A)

Into a 2λ three necked flask equipped with a stirrer and a reflux condenser, 1125 mλ of deionized water and 75 mλ of 2% aqueous polyvinyl alcohol solution were introduced and stirred to obtain a dispersion. To the obtained dispersion, a preliminarily prepared mixture comprising 227.3 g of styrene, 12.7 g of divinylbenzene (purity: 56.5%), 60.0 g of polystyrene and 0.96 g of 25% water-containing benzoyl peroxide, was added all at once, and the mixture was stirred and dispersed. After dispersing, the mixture was heated to 80° C., and the reaction was conducted under stirring at this temperature for 8 hours. After completion of the reaction, the formed polymer was collected by filtration and then thoroughly washed with deionized water.

Then, into a 3λ three necked flask equipped with a stirrer and a reflux condenser, the above polymer and 1680 mλ of toluene were introduced and heated to 40° C., and extraction of polystyrene in the polymer was conducted by stirring the mixture at this temperature for one hour. After the extraction, the polymer was separated from toluene by filtration.

The above extraction operation was repeated 3 times, and then 1440 mλ of deionized water was added thereto. The mixture was heated to 100° C., and toluene in the polymer was distilled off under stirring at this temperature for 8 hours. Then, the polymer collected by filtration was dried under heating under reduced pressure. Polymer (A) thus obtained was white opaque spherical particles.

Polymer (B)

Into a 2λ three necked flask equipped with a stirrer and a reflux condenser, the same dispersion as in the case of polymer (A) was prepared. To the obtained dispersion, a preliminarily prepared mixture comprising 145.9 g of styrene, 24.1 g of divinylbenzene (purity: 56.5%), 119.0 g of isooctane and 0.68 g of 25% water-containing benzoyl peroxide, was added all at once, and then the mixture was stirred and dispersed. After dispersing, the mixture was heated to 80° C., and the reaction was conducted under stirring at this temperature for 8 hours. After completion of the reaction, the formed polymer was collected by filtration and then thoroughly washed with deionized water. Then, into a 3λ three necked flask equipped with a stirrer and a reflux condenser, the above polymer and 1020 mλ of deionized water were introduced and heated to 100° C., and extraction of isooctane in the polymer was conducted under stirring at this temperature for 8 hours. Then, the polymer collected by filtration, was dried under heating under reduced pressure. Polymer (B) thus obtained was white opaque spherical particles.

2. Chloromethylation reaction

Into a 2λ three necked flask equipped with a stirrer and a reflux condenser, 100 g (297-1000 μm) of the above polymer (A), 240 g of dichloroethane and 323 g of chloromethyl methyl ether were introduced and stirred to let polymer (A) swell. Then, 50 g of anhydrous zinc chloride was added thereto, and the mixture was heated to 55° C. Then, the reaction was conducted for 10 hours under stirring. After completion of the reaction, chloromethylated polymer (A) thereby formed, was collected by filtration and then dried under heating under reduced pressure.

Also with respect to polymer (B), a chloromethylation reaction was conducted in the same manner as described above to obtain chloromethylated polymer (B).

(1) Measurement of ion exchange capacity 2N sodium hydroxide was permitted to flow through a column packed with a chelate resin and then deionized water was permitted to flow therethrough to thoroughly wash the resin. Then, 5.0 mλ of the resin was accurately sampled and packed into a column, and 2N hydrochloric acid was permitted to flow therethrough and then deionized water was permitted to flow therethrough to thoroughly wash the resin. Then, attached water was removed by a centrifugal separator, and then the resin was put into a 300 mλ Erlenmeyer flask, and 100 mλ of 0.2N sodium hydroxide was added thereto. The mixture was shaken at room temperature for 15 hours by a shaking machine (100 rpm, 4 cm stroke). After completion of shaking, 10 mλ of the supernatant was sampled and titrated with 0.1N hydrochloric acid to obtain the amount of remaining sodium hydroxide, which was then converted to an ion exchange capacity (meq/mλ-resin).

(2) Measurement of a Ca adsorption capacity

Into a 300 mλ Erlenmeyer flask, 200 mλ of a 0.2M tris-hydrochloric acid buffer solution (pH 8.0) of 0.05M calcium chloride (dihydrate) was introduced. Then, 5.0 mλ of a chelate resin treated by permitting 2N sodium hydroxide to flow through the column and thoroughly washed by permitting deionized water to flow therethrough, was accurately sampled by a measuring cylinder. Then, attached water was removed by a centrifugal separator, and the resin was added to the above-mentioned buffer solution in the Erlenmeyer flask. Then, the Erlenmeyer flask was shaken at room temperature for 20 hours by a shaking machine (100 rpm, 4 cm stroke). After completion of shaking, 5 mλ of the supernatant was sampled and titrated with 0.01M disodium ethylendiamine tetraacetate to obtain the amount of remaining calcium, which was then converted to a Ca ion exchange capacity (meq/mλ-resin).

(3) Measurement of a cycling strength 13.0 mλ (volume before the test) of a sieved chelate resin having a particle size of from 850 to 425 μm was accurately measured by a measuring cylinder and packed into a glass column. 2N sodium hydroxide was permitted to flow through the column at a flow rate of 6.5 mλ/min, and then deionized water, 2N hydrochloric acid and deionized water were permitted to flow therethrough for 20 minutes each. Such an operation was regarded as one cycle and repeated 50 times. Then, the resin was sieved with a sieve of 425 μm, and the volume of the chelate resin remained on the sieve (the volume of the resin after the test) was measured by a measuring cylinder.

On the other hand, the percentage of completely spherical particles in the chelate resin particles was obtained as an appearance index before and after the test.

From the above results, the cycling strength was calculated by the following equation:

$$\text{Cycling strength} = A^{A'} \times B^{B'} \times 100$$

where

A: Appearance index before the test (%)
A': Appearance index after the test (%)
B: Volume of the resin before the test (mλ)
B': Volume of the resin after the test (mλ)

EXAMPLES 1 TO 3 AND COMPARATIVE EXAMPLES 1 AND 2

Into a 1λ three necked flask equipped with a stirrer and a reflux condenser, 100 g of chloromethylated polymer (A) and 300 g of toluene were introduced and heated to 60° C. The polymer was permitted to swell under stirring at this temperature for one hour. Then, the mixture was cooled to 20° C. or lower, and 2.0 mol of the amine mixture as identified in Table 1 (monoethanolamine (MEA)/ethylenediamine (EDA)) was added thereto. The mixture was heated to 80° C., and an amination reaction was conducted under stirring at this temperature for 8 hours.

After completion of the reaction, deionized water was added thereto, and the mixture was heated to 100° C. Then, distillation of toluene was conducted under stirring at this temperature for 5 hours. Then, the resin was separated by filtration and thoroughly washed with deionized water to obtain an aminated resin.

Then, into a 1λ three necked flask equipped with a stirrer and a reflux condenser, 120.0 g of swelled aminated polymer (A), 65.1 mλ of concentrated hydrochloric acid, 55.4 mλ of 37% formaldehyde and an aqueous solution having 60.5 g of phosphorous acid dissolved in 49.6 mλ of deionized water, were introduced, and the mixture was heated to 100° C. Then, the reaction was conducted under stirring at this temperature for 4 hours. After completion of the reaction, the resin was collected by filtration and thoroughly washed with deionized water. The obtained chelate resin was slightly yellow and opaque. The results of evaluation of the physical properties of the respective chelate resins are shown in Table 1.

TABLE 1

| | Comparative Example 1 | Example 1 | Example 2 | Example 3 | Comparative Example 2 |
|---|---|---|---|---|---|
| Monoamine MEA | 0% | 20% | 40% | 60% | 100% |
| (mol) | 0.0 | 0.4 | 0.8 | 1.2 | 2.0 |
| (g) | 0.0 | 24.4 | 48.9 | 73.3 | 122.2 |
| Polyamine EDA | 100% | 80% | 60% | 40% | 0% |
| (mol) | 2.0 | 1.6 | 1.2 | 0.8 | 0.0 |
| (g) | 120.2 | 96.2 | 72.1 | 48.1 | 0.0 |
| Physical properties | | | | | |
| Ion exchange capacity | 2.24 | 2.18 | 2.11 | 1.99 | 1.59 |
| Ca adsorption capacity | 1.85 | 1.82 | 1.65 | 1.40 | 0.70 |
| Cycling strength | 0.0 | 43.9 | 94.7 | 98.0 | 99.9 |

EXAMPLES 4 AND 5 AND COMPARATIVE EXAMPLES 3 AND 4

Chelate resins were prepared in the same manner as in the preceding Examples except that chloromethylated polymer (B) was used and the amine mixtures as identified in Table 2 were used, and evaluation of the physical properties was conducted in the same manner. The results of the evaluation of the physical properties of the respective chelate resins obtained, are shown in Table 2.

TABLE 2

| | Comparative Example 3 | Example 4 | Example 5 | Comparative Example 4 |
|---|---|---|---|---|
| Monoamine MEA | 0% | 40% | 60% | 100% |
| (mol) | 0.0 | 0.8 | 1.2 | 2.0 |
| (g) | 0.0 | 48.9 | 73.3 | 122.2 |
| Polyamine EDA | 100% | 60% | 40% | 0% |
| (mol) | 2.0 | 1.2 | 0.8 | 0.0 |
| (g) | 120.2 | 72.1 | 48.1 | 0.0 |
| Physical properties | | | | |
| Ion exchange capacity | 1.91 | 1.67 | 1.56 | 1.15 |
| Ca adsorption capacity | 1.44 | — | 1.06 | 0.55 |
| Cycling strength | 41.0 | 89.3 | 99.9 | 99.9 |

EXAMPLES 6 AND 7 AND COMPARATIVE EXAMPLE 5

Chelate resins were prepared in the same manner as in the Examples 1 to 3 except that chloromethylated polymer (B) and the amine mixtures as identified in Table 3 were used, and evaluation of the physical properties was conducted in the same manner.

The results of the evaluation of the physical properties of the respective chelate resins thereby obtained, are shown in Table 3. In Table 3, DETA represents diethylenetriamine.

TABLE 3

| | Comparative Example 5 | Example 6 | Example 7 |
|---|---|---|---|
| Monoamine MEA | 0% | 40% | 60% |
| (mol) | 0.0 | 0.8 | 1.2 |
| (g) | 0.0 | 48.9 | 73.3 |
| Polyamine DETA | 100% | 60% | 40% |

TABLE 3-continued

|  | Comparative Example 5 | Example 6 | Example 7 |
|---|---|---|---|
| (mol) | 2.0 | 1.2 | 0.8 |
| (g) | 206.3 | 123.8 | 82.5 |
| Physical properties |  |  |  |
| Ion exchange capacity | 1.92 | 1.80 | 1.68 |
| Cycling strength | 25.8 | 79.7 | 97.0 |

EXAMPLES 8 AND 9

Chelate resins were prepared in the same manner as in the Examples 1 to 3 except that chloromethylated polymer (B) was used and the amine mixtures as identified in Table 4 were used, and evaluation of the physical properties was conducted in the same manner. The results of the evaluation of the physical properties of the respective chelate resins thereby obtained, are shown in Table 4. In Table 4, TETA represents triethylenetriamine.

TABLE 4

|  | Example 8 | Example 9 |
|---|---|---|
| Monoamine MEA | 40% | 60% |
| (mol) | 0.8 | 1.2 |
| (g) | 48.9 | 73.3 |
| Polyamine TETA | 60% | 40% |
| (mol) | 1.2 | 0.8 |
| (g) | 175.5 | 117.0 |
| Physical properties |  |  |
| Ion exchange capacity | 1.85 | 1.74 |
| Cycling strength | 91.5 | 97.4 |

APPLICATION EXAMPLE

Liquid column chromatographic tests were conducted with respect to the chelate resin obtained in Example 3 and a known chelate resin (functional groups: iminodiacetic acid groups) in the following manner.

As the stock solution, the one prepared by dissolving calcium chloride in deionized water to have a concentration of 300 mg Ca/$\lambda$ and a pH of 9.0, was used. Obtained leak curves are shown in FIG. 1. In the Figure, (a) represents the leak curve of the chelate resin of the present invention, and (b) represents the leak curve of the known chelate resin.

TEST METHOD 2N sodium hydroxide was permitted to flow through a column packed with the chelate resin, and then deionized water was permitted to flow therethrough to thoroughly wash the resin. Then, 40.0 m$\lambda$ of the chelate resin after washing was accurately sampled and packed into a glass column having an inner diameter of 10 mm and equipped with a jacket. The height of the column was 51 cm. While maintaining the column temperature at 60° C., the stock solution was permitted to flow from the top at a flow rate of 80.0 m$\lambda$/min. The eluted solution was sampled at predetermined intervals and Ca in the eluted solution was analyzed by an EDTA titration method to obtain a leak curve. From the results, it is evident that when the resin of the present invention is used, the treatment can be conducted without leakage of calcium ions, as compared with the case where the conventional chelate resin is used.

Further, with respect to the respective chelate resins, calcium break through capacities (BTC) were measured, and the results are shown in Table 5.

The break through point (BTP) was taken as Ca=10.0 mg/$\lambda$.

TABLE 5

|  | Ca-BTC (eq/l-resin) |
|---|---|
| Chelate resin of Examples 3 | 1.03 |
| Iminodiacetic acid group-type chelate resin | 0.75 |

As described in the foregoing, according to the present invention, an aminophosphoric acid-type chelate resin having a high ion exchange capacity and excellent cycling strength, can be obtained. The chelate resin of the present invention can be used advantageously particularly for the purification of brine to be used as a starting material for electrolytic caustic soda.

What is claimed is:

1. A process for producing an aminophosphoric acid-type chelate resin, which comprises aminating halomethyl groups of a polymer having the halomethyl groups on aromatic nuclei, followed by phosphomethylation, wherein the amination reaction is conducted by means of an amine mixture comprising a monoamine and a polyamine, wherein the proportion of the monoamine to the total amount of both amines is from 20 to 70% by mole.

2. The process according to claim 1, wherein the monoamine is selected from the group consisting of a monoalkanolamine having at most 5 carbon atoms and a monoalkylamine having at most 5 carbon atoms.

3. The process according to claim 1, wherein the monoamine is a monoalkanolamine having at most 5 carbon atoms.

4. The process according to claim 1, wherein the polyamine is selected from the group consisting of an alkylenediamine having from 2 to 8 carbon atoms, polyethylene polyamine and their N-monoalkyl derivatives.

5. The process according to claim 1, wherein the polyamine is an alkylenediamine.

6. The process according to claim 1, wherein the proportion of the monoamine to the total amount of both amines is from 30 to 60% by mole.

7. The process according to claim 1, wherein the amination reaction is conducted in the presence of a solvent selected from the group consisting of toluene, benzene, nitrobenzene, monochlorobenzene and dioxane under such a condition that the polymer is adequately swelled.

8. The process according to claim 1, wherein the phosphomethylation reaction is conducted after thoroughly washing the polymer after the amination reaction to remove unreactedmonoamine and polyamine and suspending the polymer in water to let it swell and reacting formaldehyde and phosphorous acid thereto under stirring at a temperature of at least 70° C. in the presence of a small amount of hydrochloric acid or sulfuric acid.

9. The process according to claim 1, wherein the polymer having the halomethyl groups on aromatic nuclei is a spherical product obtained by suspension polymerization of a polymerizable monomer containing an aromatic monovinyl monomer in the presence of a crosslinking monomer followed by halomethylation.

10. The process according to claim 9, wherein the crosslinking monomer is divinyl benzene.

11. The process according to claim 9, wherein the aromatic monovinyl monomer is styrene and/or an alkylstyrene.

12. The process according to claim 9, wherein the spherical product has a porous structure.

* * * * *